United States Patent [19]

Doudement

[11] Patent Number: 5,326,250
[45] Date of Patent: Jul. 5, 1994

[54] OPENING AND CLOSING MECHANISM FOR PORTFOLIO BLOWING AND BLOWING-STRETCHING MOLD

[75] Inventor: Gerard Doudement, Le Havre, France

[73] Assignee: Sidel, Le Havre Cedex, France

[21] Appl. No.: 949,127

[22] Filed: Sep. 23, 1992

[30] Foreign Application Priority Data

Sep. 24, 1991 [FR] France .................. 91 11749

[51] Int. Cl.⁵ .............................. B29C 49/56
[52] U.S. Cl. ...................... 425/541; 425/451.4
[58] Field of Search ............. 425/541, 522, 451.4, 425/450.1

[56] References Cited

U.S. PATENT DOCUMENTS

| | | | |
|---|---|---|---|
| 3,599,280 | 8/1971 | Rosenkranz et al. | 425/541 X |
| 3,608,152 | 9/1971 | Fink et al. | 425/451.4 X |
| 3,761,212 | 9/1973 | Kontz | 425/541 X |
| 4,822,275 | 4/1989 | Voss et al. | 425/541 X |
| 4,834,642 | 5/1989 | Voss et al. | 425/450.1 X |
| 5,064,366 | 11/1991 | Voss | 425/451.4 X |

FOREIGN PATENT DOCUMENTS 2646802 9/1991 France .
2653058 4/1992 France .
1230090 4/1971 United Kingdom .

*Primary Examiner*—Richard L. Chiesa
*Attorney, Agent, or Firm*—Sughrue, Mion, Zinn, Macpeak and Seas

[57] ABSTRACT

A mechanism for opening and closing a portfolio blowing or stretching-blowing mold used to manufacture plastic containers. A stationary pin (4) supports two rotating half-molds (3), and two curved control arms (9) are joined at their one ends to the two half-molds on either side of the pin (4). A cam device includes a loose follower roller (16) on a support shaft (16a) parallel to the pin (4), and a guide cam (17) moves the roller perpendicular to (toward and away from) the pin (4). The connection between the roller and the other end of the two arms (9) includes a pair of normally parallel connection rods (13, 14) whose one ends individually support the shaft (16a) and a shaft (10) connecting the other ends of the arms (9), and whose other ends are mounted on a shaft (15) parallel to the shaft (4), the connection rods being oriented transverse to a mold joint plane (M) containing the pin (4) and the shaft (10). The connection rods are coupled by a ball and detent arrangement, which releases in the event of an excessive load.

6 Claims, 3 Drawing Sheets

OPENING AND CLOSING MECHANISM FOR PORTFOLIO BLOWING AND BLOWING-STRETCHING MOLD

BACKGROUND OF THE INVENTION

This invention concerns improvements made to opening and closing devices for wallet or portfolio-type blowing or stretching-blowing molds that can be used, in particular, for the manufacture of plastic containers such as bottles, flasks, etc., the mold comprising two half-molds pressed against each other in the closed position of the mold.

The invention is applicable to molding configurations in which the half-molds are mounted directly so as to rotate on a common swivel pin, and to molding configurations more frequently used because of their ease of use, in which the half-molds are detachably joined to respective supports, which are in turn mounted so as to rotate on the common swivel pin. To simplify the explanations provided, use will be made hereinafter only of the term "half-mold" it being understood that the half-mold alone or the half-mold and its base will be meant, depending on the configuration in which the invention will be embodied.

In molding equipment such as that designed for the manufacture of plastic containers, of the type incorporating, for example, several associated molds on a revolving plate or turret, the various movements required for the operation of the molds are controlled by cam and motion transmission mechanisms. This is especially true as regards the control of the opening and closing of the molds.

Numerous mold opening and closing devices are known, in particular that described in commonly assigned French Patent No. 2,653,058, which, by virtue of its operating principle, proves entirely satisfactory.

SUMMARY OF THE INVENTION

The main purpose of the present invention is to propose an improved mold opening and closing device which, while retaining the advantages of devices according to the prior art, and in particular those of the above French patent, has less bulk and a simplified structure, not only to reduce cost, but also to allow the use of molds having greater volumes without increasing the dimensions of the plate supporting them; which permits simplification of the mechanical controls so as to facilitate operation and obtain enhanced reliability; which allows the safety mechanism to be simplified; and which incorporates fewer sliding parts, and thus, fewer parts subject to wear, thereby reducing maintenance.

To these ends, a mold opening and closing device configured according to the invention is characterized basically by the fact that the connection means comprise at least one connection rod which supports, at one end, a roller-support shaft and a coupling shaft joining the other ends of a control arm, and whose other end is mounted in free rotation on a pin substantially parallel to the swivel pin of the half-molds, the connection rod extending approximately transversely to the plane containing the swivel pin of the half-molds and the coupling shaft belonging to the control arms.

In a preferred embodiment, the connection element incorporates two superposed connection rods joined by coupling means, the two connection rods supporting, at one of their ends, the roller-support arm and the coupling shaft linking the control arms, respectively, and being mounted so as to rotate freely at their other ends on the pin parallel to the swivel pin. In this instance, the roller-support shaft and the shaft connecting the control arms may be substantially coaxial.

In this arrangement, provision may be made so that the coupling means are safety coupling means which, beyond a predetermined stress threshold, can release the two connection rods from each other, which then can describe a movement of rotation around their common axis moving them away from each other. In this case, the coupling means may further comprise stop means capable of limiting the common spacing separating the two release connection rods, in the event of an excessive load.

It is also possible to improve this device by further fitting the connection means with bracing means interposed between the connection rods, so that the vertical spread between the connection rods is kept substantially constant.

A simple structure may, however, be produced by combining the stop and the bracing means and by forming them from a curved oblong slot cut in one of the connection rods, and by a supported finger fitted through the slot and connected to the other connection rod.

Thus, a mold opening and closing device according to the invention preserves the advantageous basic operation of the devices according to the prior art, and in particular that in the above French patent, but is found to be much more advantageous because of a simplified, less bulky structure, without sliding components. It incorporates no translational motion guidance and thus requires no play-adjustment mechanism. Operational reliability is improved, maintenance is reduced, and, from an overall perspective, its manufacturing and maintenance costs are lessened.

DETAILED DESCRIPTION OF THE PREFERRED EMBODIMENT

Figure 1:
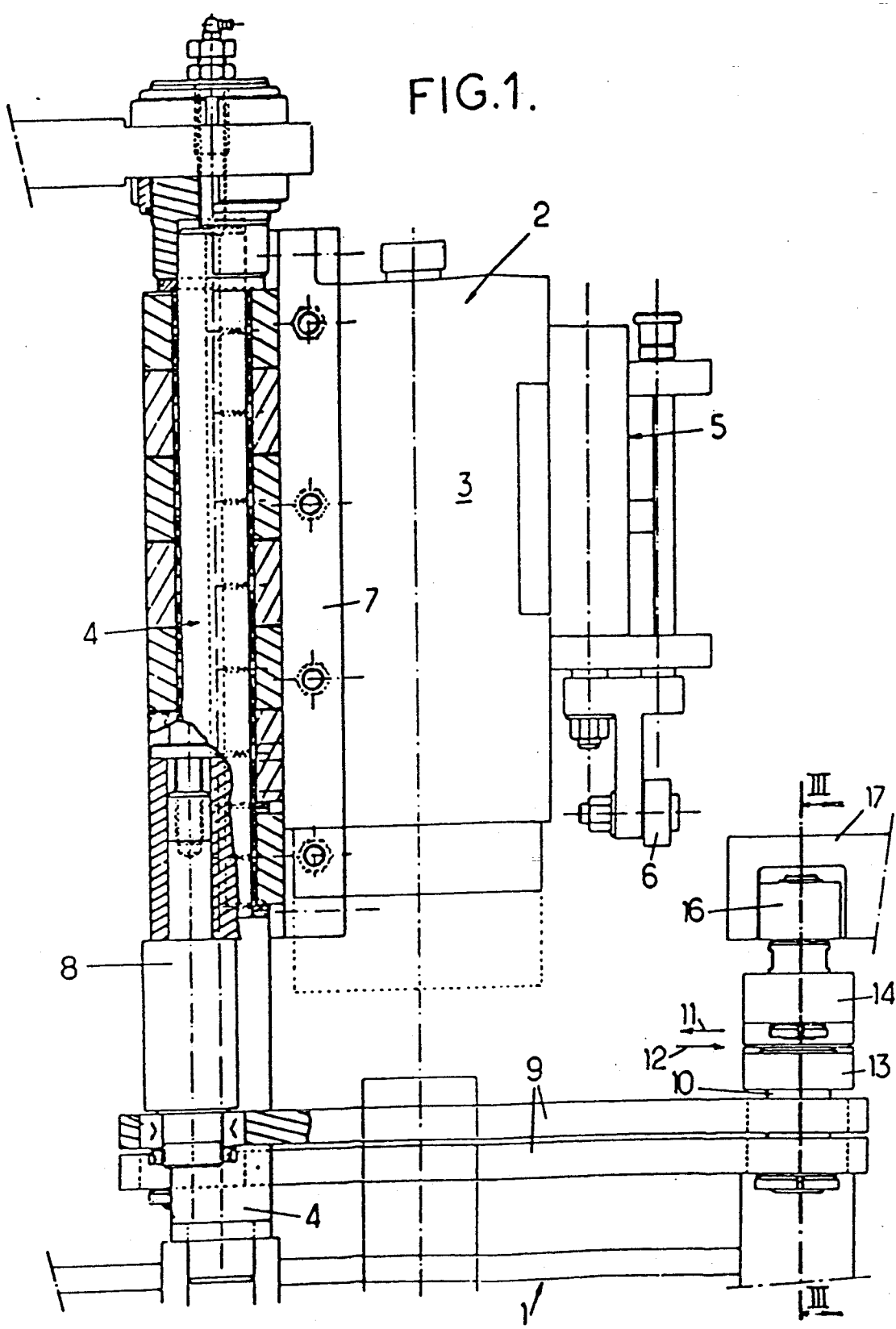
FIG. 1 is a partial cross-section along line I—I in FIG. 2 of a molding machine equipped with the mold opening and closing device according to the invention.
Figure 2:
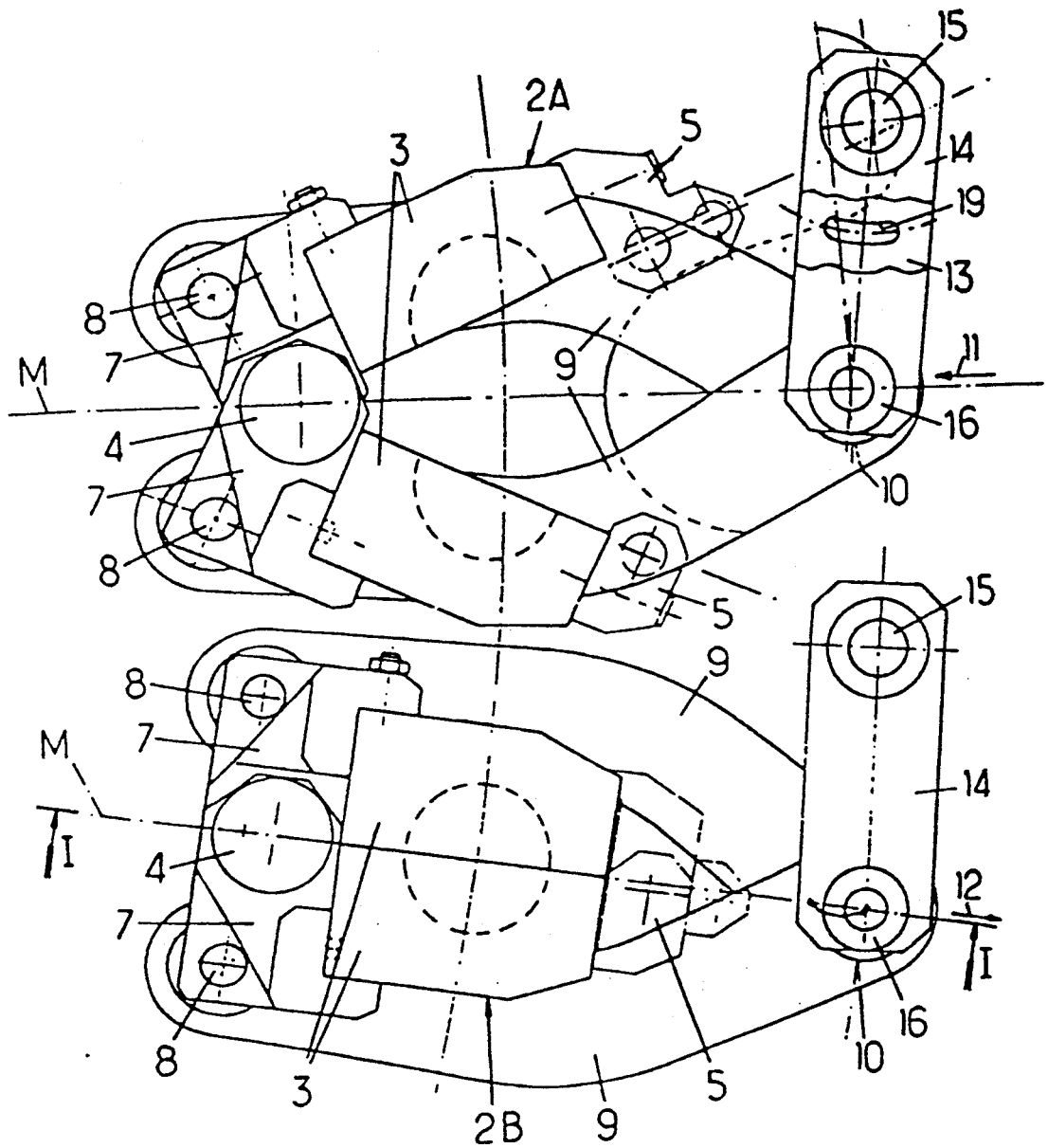
FIG. 2 is a top view showing two molds in the machine in FIG. 1, in two different operating positions, respectively.
Figure 3:
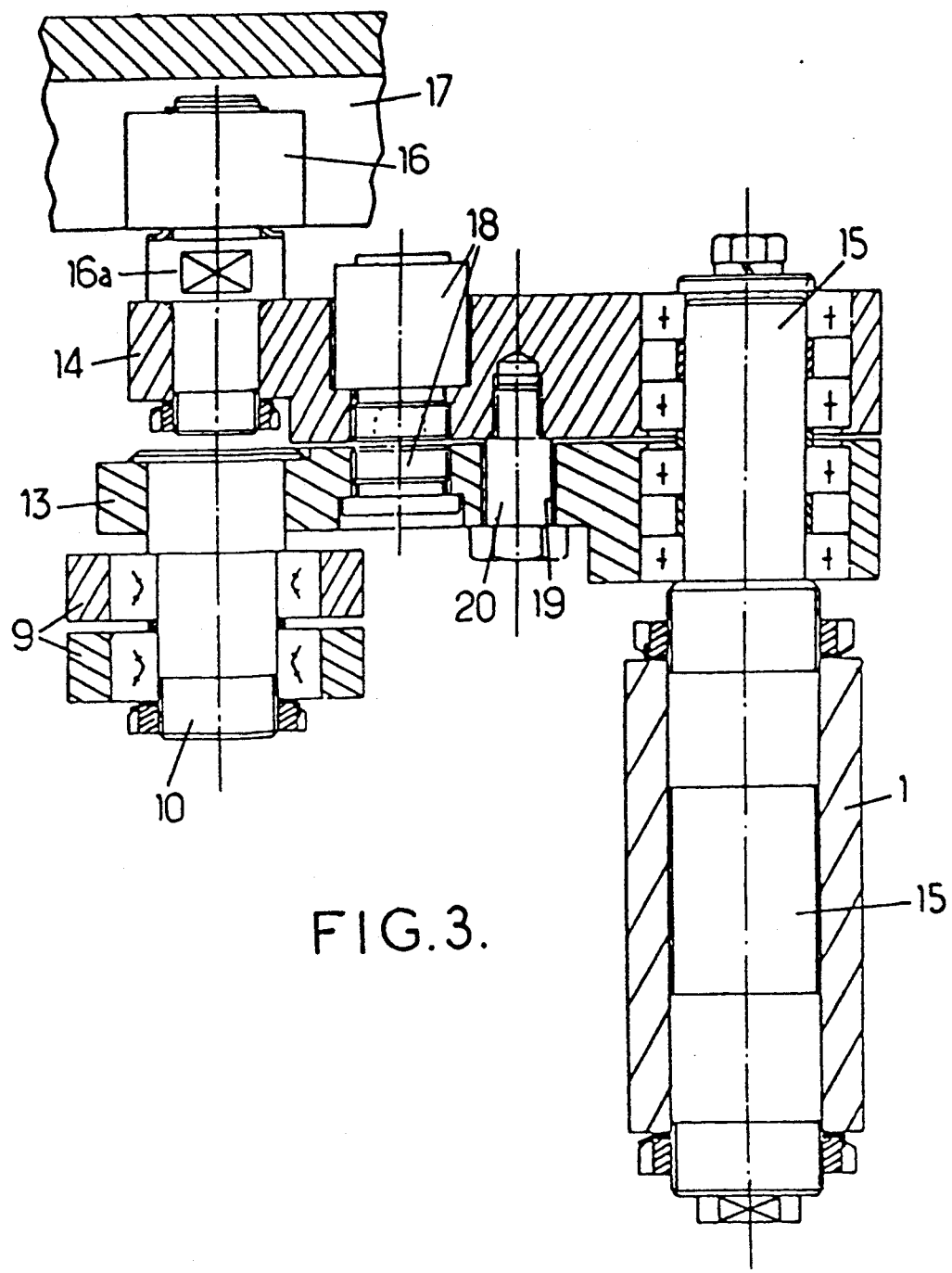
FIG. 3 is a cross-section along line III—III in FIG. 1.

The molding machine shown partially in FIGS. 1 to 3 (only the parts necessary for understanding of the invention are shown) is a revolving machine comprising a turret plate 1 which turns around a vertical drive shaft (not shown) and which supports several molds 2 spread out angularly along its circumference (in FIG. 2, two consecutive molds 2A and 2B are shown). The invention is not limited to this type of machine incorporating a revolving plate, which is considered here solely as an example.

Each mold 2 is a blowing or stretching-blowing portfolio-type mold that can be used, in particular, for the manufacture of plastic containers (e.g., those made of polyethyleneterephthalate, or PET), such as bottles, flasks, etc. Each mold 2 is made of two half-molds 3 connected to each other at the rear by a vertical swivel pin 4, which is also the device used for mounting on the plate 1. To the front, i.e., toward the periphery of the plate, the molds 2 are equipped with suitable locking means (designated in their entirety by reference numeral 5), which lock the two half-molds 3 in the closed position. Actuation of these locking means 5 is controlled by a roller 6 connected to them and capable of working in conjunction with stationary cams in the machine, i.e., an unlocking and a locking cam, respectively.

The invention proposes a device of simple design for opening and closing each mold.

In the example under consideration, each half-mold is mounted so as to permit movement (using screws, for example) on a support structure formed by two square-shaped supports 7 joined in a rotational arrangement on the pin 4. These two supports 7 are, in the respective angled area and thus, at a distance from the common swivel pin 4, equipped with respective pins 8 which are rotatably connected to the supports. These two pins 8 project outward beneath the supports 7 and support, respectively, the free ends of two control arms 9 located at different levels, which are free to rotate.

The two control arms 9 extend in approximately parallel fashion toward the periphery of the plate, and curve toward each other in front of the mold 2, their two corresponding ends being joined so as to rotate freely on a common, substantially vertical coupling shaft 10.

Thus, radial movement (considered in relation to the plate 1) of the coupling shaft 10 makes it possible, by means of the control arms 9, to control the opening or closing of each mold. In FIG. 2, the mold 2A (at the top of the drawing) is opened by means of the action of a radial movement toward the interior (arrow 11) of the coupling shaft 10. The mold 2B (at the bottom of the figure) is closed by virtue of a radial motion (arrow 12) directed toward the outside of the coupling shaft 10.

To bring about this motion of the shaft 10, it is associated with two superposed connection rods 13 and 14 which begin at the shaft 10 and extend approximately perpendicularly to the plane M which joins the axes of the shafts 4 and 10 and which coincides with the joint line of the two half-molds 3. One end of the lower connection rod 13 is joined so as to rotate freely on the coupling shaft 10, and its other end is articulated in free rotation on a stationary support pin 15 mounted on the plate 1. One end of the upper connection rod 14 is articulated so as to rotate freely on the support pin 15, and its other end supports a loose roller 16 whose vertical axis 16a is substantially coaxial to the coupling shaft 10 in the normal operating position shown in FIGS. 1 to 3. The roller 16 works in conjunction with a gutter-shaped cam 17 whose longitudinal configuration is suitable for causing the desired motion of the half-molds.

The two connection rods 13 and 14 are, in addition, brought together and kept in the superposed position by safety coupling means 18, e.g., of the spring loaded ball and detent type, which can, beyond a predetermined stress threshold, release the two connection rods 13 and 14 from each other, these rods then tending to describe a movement of rotation around the support pin 15 while moving away from each other. Thus, in the event of an excess load or of locking, the plate 1 disengages temporarily from the cam 17 connected by means of the connection rods 13, 14, thereby avoiding serious damage to the machine and providing for a short delay allowing emergency switch-off of the equipment.

Moreover, to simultaneously keep the two connection arms 13, 14 superposed with constant spacing between them during normal operation and to restrict their common angular separation in the event of excess load, the lower connection rod 13 incorporates a curvilinear elongated slot 19 centered around the pin 15, and a shouldered screw 20 is inserted through this slot and screwed into the upper connection rod 14.

It will be noted, in particular, that the mechanism described above comprises no translational motion guidance and thus requires no play-adjustment device. This mechanism is very compact and, since it is positioned on the periphery of the plate, it makes available increased free space for the placement of the molds, which can, if necessary, be larger than shown.

I claim:

1. An opening and closing mechanism for a portfolio blowing or stretching-blowing mold used for the manufacture of plastic containers such as bottles and flasks, said mold comprising two half-molds pressed against each other in the closed position of the mold, said mechanism comprising:
   a) a stationary common swivel pin (4) supporting the two half-molds (3) in free rotation,
   b) two control arms (9) connected in free rotation at one of their ends to the two half-molds (3) at points on the half-molds located on opposite sides of the swivel pin,
   c) cam means comprising at least one follower roller (16) loosely mounted on a roller-support shaft substantially parallel to said swivel pin (4), and at least one guide cam (17) for causing the roller to move in a direction substantially perpendicular to said swivel pin, towards and away therefrom, and which intersects the pin, and
   d) connection means for joining said roller to the other ends of the two control arms, wherein said connection means comprises two superposed connection rods (13, 14) joined together by coupling means (18-20), said two connection rods supporting, respectively, at one of their ends, the roller-support shaft (16a) and a coupling shaft (10) which joins the other ends of the control arms (9), said rods being mounted so as to rotate freely, at their other ends, on a common pin (15) substantially parallel to the swivel pin supporting the half-molds, and said connection rods extending approximately transversely to a plane (M) containing the swivel pin and the coupling shaft (10).

2. A mechanism according to claim 1, wherein said roller-support shaft and the coupling shaft are substantially coaxial.

3. A mechanism according to claim 1, wherein said coupling means are safety coupling means (18) which can, beyond a predetermined stress threshold, release the two connection rods (13, 14) from each other, which can then rotate around the common pin (15) away from each other.

4. A mechanism according to claim 3, wherein the coupling means further comprises stop means (19, 20) for limiting a reciprocal separation of the two connection rods (13, 14) in the event of an excess load.

5. A mechanism according to claim 4, wherein the stop means comprises bracing means interposed between the two connection rods such that a vertical separation between the two rods is kept substantially constant.

6. A mechanism according to claim 5, wherein the stop means and the bracing means are combined and are formed by a curved oblong slot (19) in one of the connection rods (13) and by a shouldered finger (20) inserted through said slot (19) and connected to the other connection rod (14).

* * * * *